US008825092B2

(12) United States Patent  
Sennett et al.

(10) Patent No.: US 8,825,092 B2  
(45) Date of Patent: Sep. 2, 2014

(54) MULTI-MODE PROVISION OF EMERGENCY ALERTS

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1439 days.

(21) Appl. No.: 12/056,899

(22) Filed: Mar. 27, 2008

(65) Prior Publication Data

US 2009/0247111 A1  Oct. 1, 2009

(51) Int. Cl.
*H04W 4/00* (2009.01)
*H04W 76/00* (2009.01)
*H04W 4/22* (2009.01)
*H04W 4/14* (2009.01)

(52) U.S. Cl.
CPC .............. *H04W 4/22* (2013.01); *H04W 76/007* (2013.01); *H04W 4/14* (2013.01)
USPC ........ 455/466; 455/406; 455/467; 455/456.1; 455/564; 455/566

(58) Field of Classification Search
CPC ........... H04W 4/12; H04W 4/14; H04W 4/18; H04W 4/02; H04L 51/38; H04L 12/5895; H04M 1/72552; H04M 1/72547; G06Q 10/107
USPC .......... 455/404.1–404.2, 414.1–414.3, 552.1, 455/466, 456.1, 3.01, 456.3, 411, 414.2, 455/418, 426.1, 432.1, 415, 450, 456.2
See application file for complete search history.

(56) References Cited

U.S. PATENT DOCUMENTS

| | | | |
|---|---|---|---|
| 6,112,075 A | 8/2000 | Weiser | 455/404.1 |
| 6,125,176 A * | 9/2000 | Foladare et al. | 379/211.02 |
| 7,693,938 B2 * | 4/2010 | Weiser et al. | 709/203 |
| 7,738,488 B2 * | 6/2010 | Marsico et al. | 370/466 |
| 2002/0160745 A1 * | 10/2002 | Wang | 455/404 |
| 2005/0085257 A1 * | 4/2005 | Laird et al. | 455/550.1 |
| 2006/0030333 A1 * | 2/2006 | Ward et al. | 455/456.1 |
| 2006/0040639 A1 | 2/2006 | Karl et al. | 455/404.1 |
| 2006/0206568 A1 * | 9/2006 | Verma et al. | 709/206 |
| 2006/0242010 A1 * | 10/2006 | Crolley | 705/14 |
| 2006/0273893 A1 * | 12/2006 | Warner | 340/531 |
| 2007/0207771 A1 * | 9/2007 | Bowser et al. | 455/404.1 |
| 2007/0259677 A1 * | 11/2007 | Waxman | 455/466 |
| 2009/0227224 A1 * | 9/2009 | Aftelak et al. | 455/404.2 |
| 2009/0239574 A1 * | 9/2009 | Hussain | 455/552.1 |

OTHER PUBLICATIONS

"US unveils emergency alert system for mobile phones, computers," Breitbart, http://www.breitbart.com/article.php?id=060712191204. 9i5b29n0&show_article=1, downloaded 2008, 1-2.

(Continued)

*Primary Examiner* — Joseph Arevalo  
(74) *Attorney, Agent, or Firm* — Baker & Hostetler LLP (57) ABSTRACT

Systems and methods are provided for sending emergency alerts to mobile devices in a geographical region affected by an emergency condition. An emergency alert may be broadcast via cellular network to devices with active cellular communications, while those mobile devices comprising cellular communications components that are temporarily inoperative due to their connection to wireless internet access points can be reached by sending emergency alerts via the internet.

18 Claims, 8 Drawing Sheets

(56) References Cited

OTHER PUBLICATIONS

Botterell, A., "An Advanced EAS Relay Network Using the Common Alerting Protocol (CAP)," http://www.tap.gallaudet.edu/Emergency/Nov05Conference/EmergencyReports/Advanced_EAS_Concept.pdf, 2003, 1-8.

United States Patent and Trademark Office: U.S. Application dated Jan. 18, 2007, U.S. Appl. No. 11/624,503, 23 pages.

United States Patent and Trademark Office: U.S. Application dated Sep. 15, 2006, U.S. Appl. No. 11/532,265, 26 pages.

United States Patent and Trademark Office: U.S. Application dated Sep. 15, 2006, U.S. Appl. No. 11/532,299, 23 pages.

United States Patent and Trademark Office: U.S. Application dated Sep. 15, 2006, U.S. Appl. No. 11/532,367, 29 pages.

* cited by examiner

MULTI-MODE PROVISION OF EMERGENCY ALERTS

TECHNICAL FIELD

The technical field generally relates to communications systems and more specifically relates to routing emergency alerts, such as those issued by the Emergency Alert System ("EAS").

BACKGROUND

An Emergency Alert System (EAS) communicates emergency alert information to a population of people. One example of such a system is the United States EAS, which is designed to allow the President of the United States to speak directly to the general population of the United States within 10 minutes. Historically, communication channels utilized in connection with the United States EAS have been radio and television.

The prospect of including additional communication channels, especially communication to mobile devices, in an EAS is appealing because a great many people today carry mobile devices such as cellular telephones. Sending emergency alerts to mobile devices allows a great many more people to promptly receive alerts than would otherwise. For this reason, college campuses and other communities have introduced simplistic, opt-in EAS that send Short Message Service (SMS), or so-called text messages to mobile devices of those who subscribe to receive such messages, and may also send emergency alert emails to the relevant population.

In order for an EAS to function on a broader scale, however, it is desirable to broadcast emergency alerts to all mobile devices in a geographical area affected by an emergency condition, rather than simply send emergency alerts to a list of opt-in subscribers as in the example above. Broadcasting emergency alerts potentially eliminates the need to "opt-in" to receive emergency alerts, and also effectively communicates with all mobile devices in the affected area, regardless of whether such devices are in their "home" region or region for which they have opted to receive emergency alert information.

While broadcasting has clear advantages for sophisticated and large-scale EAS, so-called Third Generation (3G) and subsequent generation type mobile devices pose a problem in receiving broadcasted emergency alerts. Most 3G mobile devices can switch between radio communications with a cellular network, and wireless Internet Protocol (IP) or "Wi-Fi" type communications. When such a device enters a Wi-Fi hotspot, it will temporarily disable its cellular communications, and switch to Wi-Fi communications, because the Wi-Fi communications require less power and therefore present less drain on battery life. However, as a result of the switch, the device would no longer receive emergency alerts broadcasted from a cellular communications tower. Therefore, systems and methods are needed to communicate emergency alerts to mobile devices that have a first communications channel disabled while a second communications channel is active.

SUMMARY

In consideration of the above-identified shortcomings of the art, the present invention provides systems and methods for sending emergency alerts to mobile devices. In one embodiment, a method is performed comprising broadcasting via cellular network a Short Message Service (SMS) emergency alert to a first plurality of mobile devices in a geographical region, identifying a second plurality of mobile devices that are wirelessly connected to Wi-Fi access points in said geographical region, wherein said second plurality of mobile devices comprise cellular communications components that are temporarily inoperative due to said second plurality of mobile devices' connection to said Wi-Fi access points, and sending said SMS emergency alert to said second plurality of mobile devices using Internet Protocol (IP) communications.

In another embodiment, a method for sending emergency alerts to mobile devices may comprise identifying a plurality Wi-Fi access points in a geographical region affected by an emergency condition, and sending, using Internet Protocol (IP) communications, a Short Message Service (SMS) emergency alert to a plurality of mobile devices connected to said plurality of Wi-Fi access points, wherein said plurality of mobile devices comprise cellular communications components that are temporarily inoperative due to said plurality of mobile devices' connection to said Wi-Fi access points.

Another exemplary embodiment provides a wireless access point, such as may be used at a Wi-Fi access point, that can distribute emergency alerts to any devices in communication with such access point. Such an access point may comprise, for example, an internet interface for sending and receiving communications via Internet Protocol (IP), a Short Message Service (SMS) emergency alert authentication component that authenticates an emergency alert received via said internet interface, a wireless communications mechanism that sends and receives communications to and from mobile devices, and an emergency alert distribution component that distributes said SMS emergency alert to all mobile devices in communication with said Wi-Fi access point via said wireless communications mechanism.

Other advantages and features of the invention are described below.

BRIEF DESCRIPTION OF THE DRAWINGS

The foregoing summary, as well as the following detailed description, is better understood when read in conjunction with the appended drawings.

DETAILED DESCRIPTION OF ILLUSTRATIVE EMBODIMENTS

Certain specific details are set forth in the following description and figures to provide a thorough understanding of various embodiments of the invention. Certain well-known details often associated with mobile communications, computing, and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
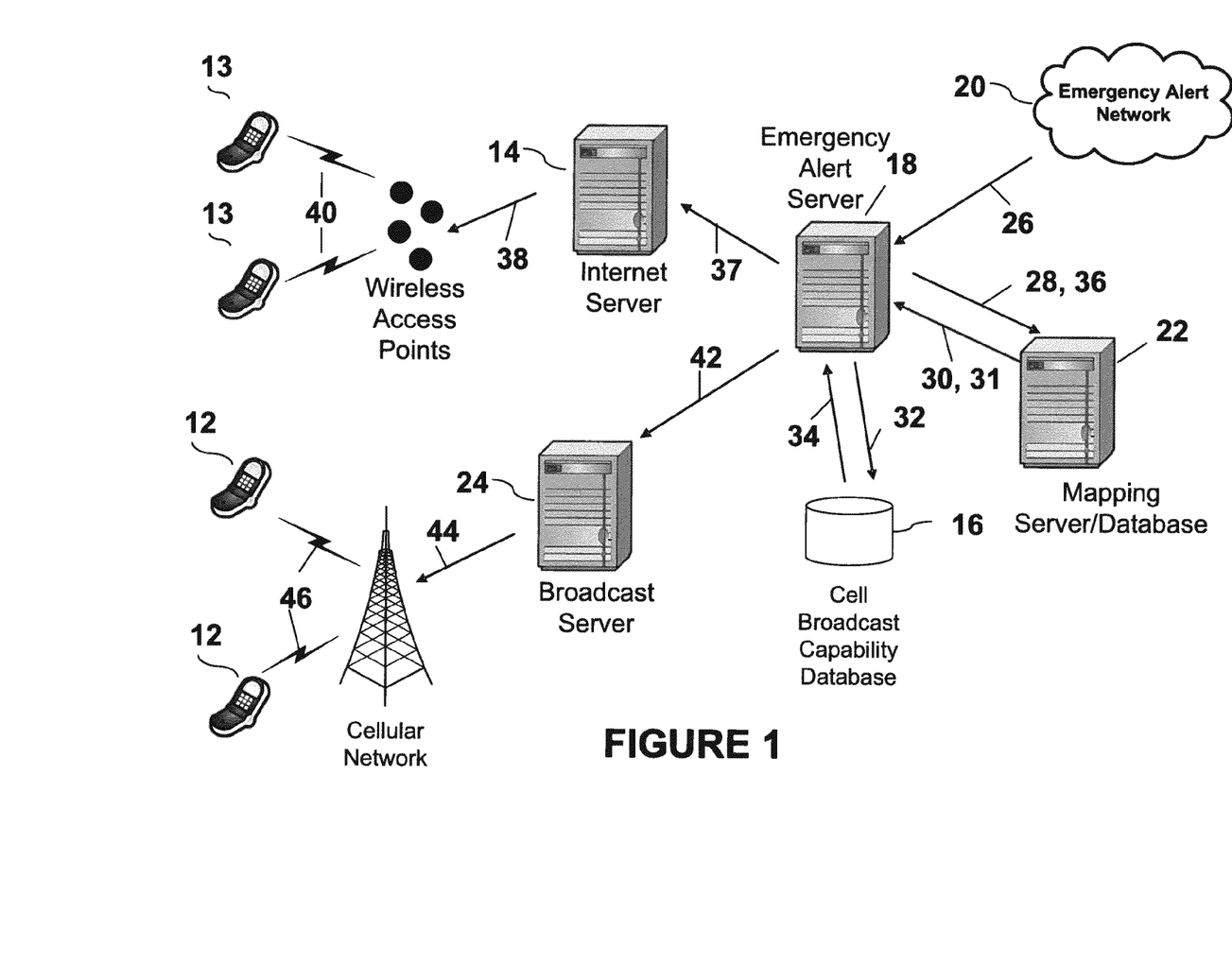
FIG. 1 diagrams an example process and system for broadcasting an emergency alert.

FIG. 1 diagrams an example process and system for broadcasting via cellular network an emergency alert to a first plurality of mobile devices in a geographical region. An emergency alert comprises information sent to a plurality of people in response to an emergency condition. The people to whom an emergency alert is sent may be the general population, or a subset of people such as emergency first responders, toxic waste cleanup crews, army reservists, and so forth. The information in an emergency alert may comprise the nature of the emergency, instructions for responding to the emergency, where to get more information about the emergency, and/or location of the emergency. One useful form for the emergency alert is that of a Short Message Service (SMS) or "text message." A number of other forms are possible, including for example voicemails, Instant Messages (IMs), and emails.

Utilizing a system such as illustrated in FIG. 1, an organization, corporation, association, or the like, for example, a mobile communications provider such as Verizon Corporation, Sprint Corporation, AT&T corporation, T-Mobile Corporation, and the like can broadcast emergency alerts to a geographic region covered by applicable cellular communication towers of the cellular radio network. A first plurality of mobile devices 12 can receive the emergency alert by cellular network broadcast, while a second plurality 13 of mobile devices can receive the emergency alert via an internet server and wireless access points as shown. In one embodiment, devices 12 and 13 are subscribers to a same mobile communications service provider, said service provider performs the broadcasting, as well as identifying the second plurality of devices 13, and sending. said emergency alert to said second plurality of mobile devices 13 using Internet Protocol (IP) communications. 6. It should further be noted that in embodiments where devices 12 and 13 belong to subscribers of a same mobile communications service provider, it would also be possible and advantageous, in many situations, to send emergency alerts additional mobile device in said geographical region using either the broadcast or IP communications capabilities illustrated in FIG. 1.

Cellular communications networks and corresponding electronics are often owned by a variety of different entities. For example, a first company may own communications equipment that transforms, transmits, or processes information as it is on its way to one or more radio towers, while a second company owns the towers and radio transmission apparatus. The term "broadcast" as used herein refers to any action performed pursuant to ultimately broadcasting information. Thus, any electrical component that transforms, transmits, or processes information in connection with a broadcast, or otherwise facilitates broadcast of information, broadcasts such information.

One exemplary broadcast of an emergency alert begins at step 26, when an Emergency Alert Network 20, e.g., a computer affiliated with a government EAS, provides to an emergency alert server 18 an emergency alert, and the information is correspondingly received at emergency alert server 18. Information regarding an applicable geographic region affected by an emergency condition may also be provided in step 26. For example, if the emergency is an earthquake in San Francisco, the relevant geographic region may be the greater San Francisco area, or for a large earthquake, perhaps a broader section of the California coast. It may not be necessary or desirable to send an emergency alert to people in New York City when such an emergency occurs, as it may only generate unnecessary panic, confusion, and corresponding load on public services. The relevant geographic region affected by an emergency condition may be supplied by the EAN 20 to the server 18.

In example embodiments, as described in more detail below, the geographic region can be defined statically and/or dynamically. A statically defined alert area can be specified in the information supplied to server 18, utilizing for example, geographic code references such as the Federal Information Processing Standard (FIPS), ZIP codes, and/or the National Weather Service Specific Area Message Encoder (SAME) codes. A dynamically defined alert area can be specified, utilizing for example, geometric shapes, such as polygons, formatted in accordance with a World Geodetic System 1984 (WGS-84) format, or the like.

At step 28, the server 18 determines cellular communications sites that correspond to a geographic region affected by an emergency condition, and that should therefore broadcast emergency alerts to mobile devices in their range. In one arrangement, as illustrated in step 28, the server 18 can provide a request to a cell site mapping server/database 22 (referred to herein as the "mapping server") for cell IDs (cell sites) associated with the geographic region. As described in more detail below, the mapping server 22 determines (e.g., maps, translates) cell IDs (cell sites) capable of providing cellular coverage to the geographic region. In various example embodiments, as described in more detail below, cell IDs capable of providing coverage to the geographic region are determined in accordance with the statically and/or dynamically defined alert areas.

Figure 2:
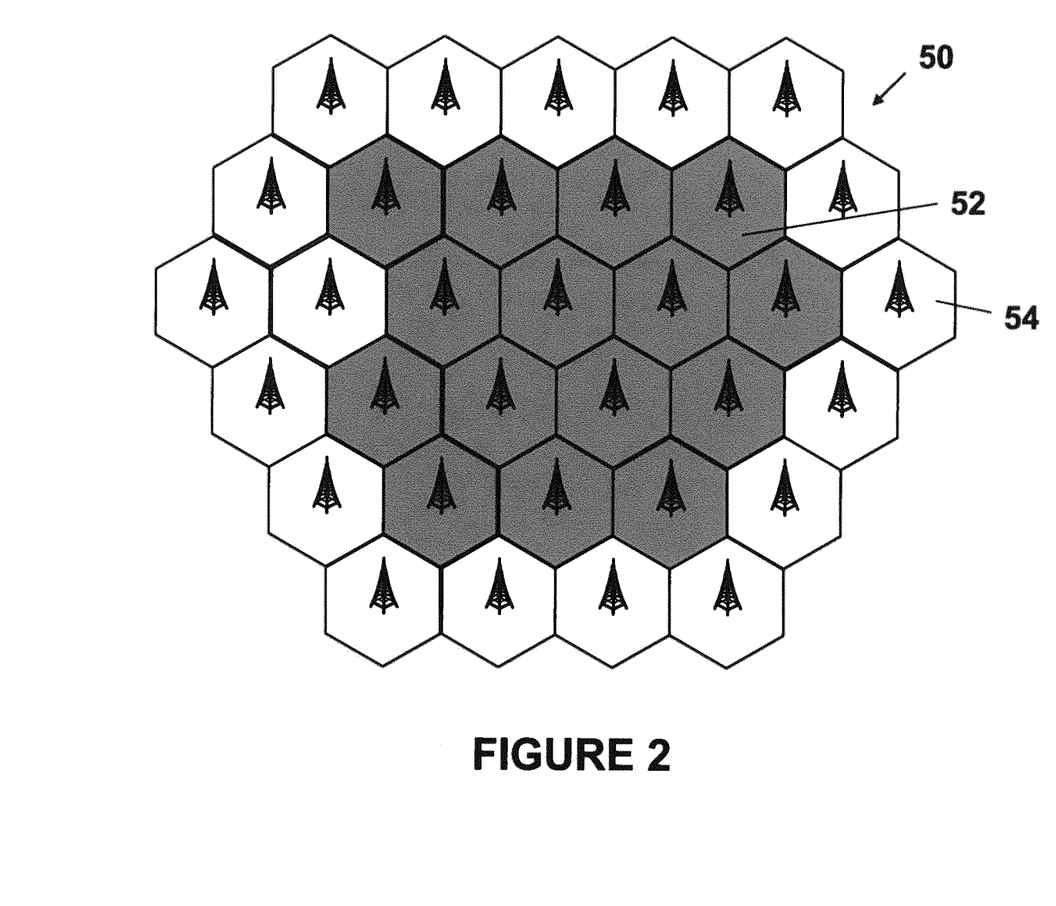
FIG. 2 is an example depiction of cell sites capable of providing cellular coverage to a geographic region.

The mapping server 22 provides, at step 30, an indication of the cell sites located in a geographic region. That is, the mapping server 22 provides an indication of cell sites capable of providing cellular coverage to the geographic region. FIG. 2 is an example depiction of cell sites capable of providing cellular coverage to a geographical region. Cell sites 50 represent example geographically contiguous cell sites capable of providing cellular coverage to the geographic region and surrounding areas. Shaded cell sites 52 represent cell sites capable of providing cellular coverage to the geographic region. Note, only one shaded cell site is labeled 52 for the sake of simplicity. Un-shaded cell sites 54 represent cell sites outside of the geographic region. That is, cell sites 54 do not provide cellular coverage to the geographic region affected by the emergency. Note, only one un-shaded cell site is labeled 54 for the sake of simplicity.

Referring back to FIG. 1, upon receiving (at step 30) the indication (e.g., list) of cell sites capable of providing cellular coverage to the geographic region, the emergency alert server 18, may determine the broadcast capability of the cell sites received. For example, the Emergency Alert Server 18 determines the broadcast capability of cell sites within the geographic region depicted in FIG. 2. The emergency alert server 18 can determine the broadcast capability of each cell site in accordance with any appropriate means, such as requesting the broadcast capability of each cell site from an appropriate processor.

At step 42 the emergency alert server 18 provides an indication of cell sites within the alert area and supporting broadcast technology (e.g., cell sites 62) to a broadcast server 24. The Emergency Alert Server 18 also provides the alert message to the broadcast server 24, at step 42. The broadcast server 24 instructs the wireless broadcast network to transmit the alert message to the identified cell sites providing coverage to the alert area and supporting broadcast technology (e.g., cell sites 62). At step 46, the broadcast cell sites broadcast via cellular network an emergency alert to a first plurality of mobile devices 12.

At step 36, a second plurality of mobile devices can be identified who are in said geographical region affected by the emergency, and are currently registered as in communication via a connection to the internet, i.e., via Internet Protocol (IP) communications. As explained above, many mobile devices, and in particular $3^{rd}$ Generation (3G) and subsequent generation type mobile devices temporarily disable their cellular communications components—components for communicating with a cellular radio network—when such devices are communicating via IP, for example, when such devices are communicating via a Wi-Fi access point. This temporarily renders communications via the cellular network inoperative. Once such devices leave communication with a Wi-Fi hotspot, communications via the cellular network are re-activated, in some cases supporting seamless transition between Wi-Fi and cellular communications modes.

The second plurality of devices may be identified by again sending a request 36 to a server such as mapping server 22. This time, mapping server 22 can supply identifiers, such as IP addresses, or other identifying information for any wireless access points in the geographical region. For example, referring to FIG. 3, the black dots 57 represent wireless access points within geographical region 52. Identifiers for these access points 57 can be supplied to the server 18 in step 31. Mapping server 22 may maintain a list comprising Wi-Fi access points and locations of all Wi-Fi access points for use in identifying all Wi-Fi access points in a given geographical region. A request to mapping server 22 that identifies a geographical region can be responded to with a listing of Wi-Fi access points in the identified region. For the purposes of this disclosure, "all" Wi-Fi access points should be construed to mean all available Wi-Fi access points, as any particular access point may be unavailable due to, for example, the existence of such access point being unknown, or the access point not being interoperable with the emergency alert system.

Figure 3:
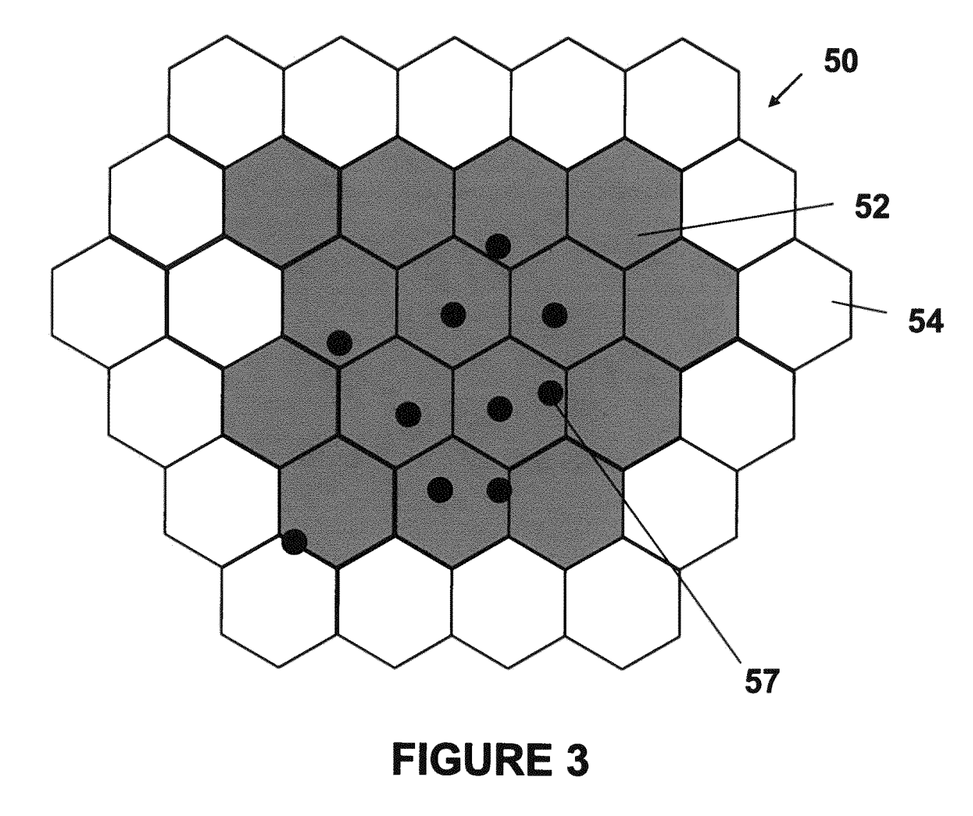
FIG. 3 is an example depiction wireless access points located within the geographic region.

Having a listing of wireless access points 57 in the geographic region, the system, e.g., server 18, can perform either of two operations to send emergency alerts to mobile devices in communication with such access points. In one embodiment, mobile devices that are connected to any of said Wi-Fi access points 57 in said geographical region may be determined, and an emergency alert may be individually sent to such devices. In another embodiment, emergency alerts may be sent to wireless access points 57 in the geographic region 52, and the wireless access points may themselves distribute the emergency alert.

To perform the first embodiment suggested above, a scan may be performed to identify devices in communication with the listed access points 57. The scan may, for example, identify mobile devices that are communicating via IP addresses corresponding to the listed wireless access points 57. For example, one or more devices 13 may communicate via wireless access points that route their communications through internet server 14. Internet server 14 will have an IP address, and will assign devices 13 IP addresses that are identifiably "children" of the address assigned to internet server 14. A scan for devices connected via access points 57 can thus comprise identifying the IP addresses of servers 14 associated with such access points 57, and then searching for all devices with IP addresses that currently partially match the IP address of server 14. Once the IP addresses are identified, sending an emergency alert entails sending an emergency alert to each identified device, for example by addressing an SMS emergency alert to each of said plurality of mobile devices 13. The emergency alerts can be sent in step 37 to the internet, eventually arriving at internet server 14 which routes the communication 38 to the appropriate wireless access points, which in turn deliver the emergency alerts 40 to the various mobile devices 13.

Figure 4:
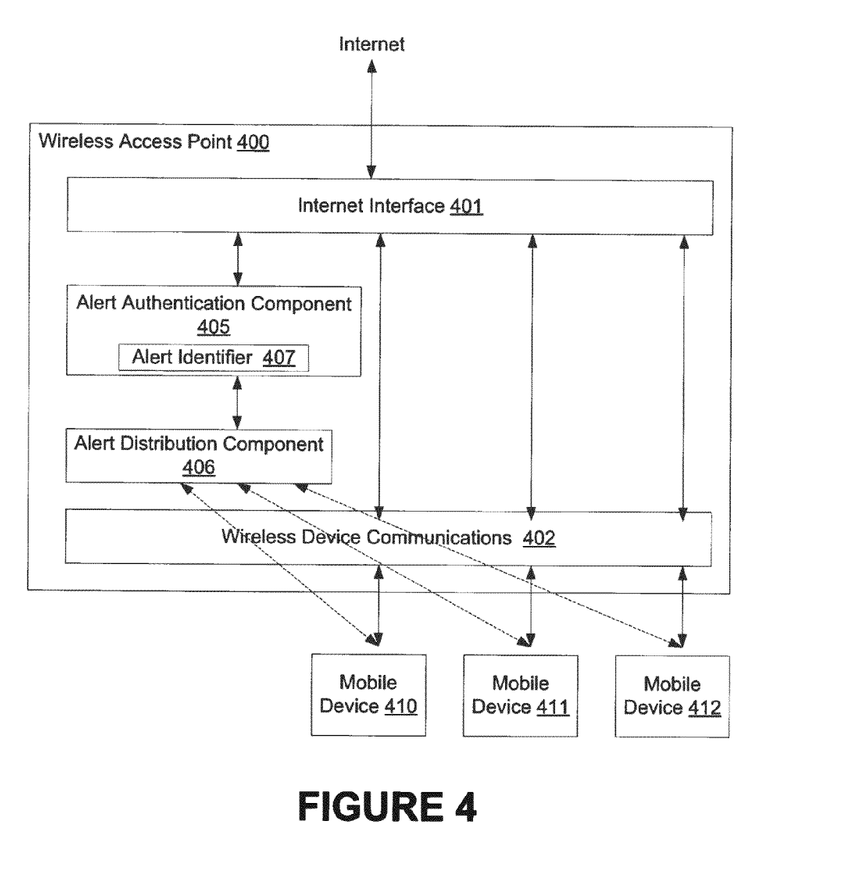
FIG. 4 illustrates an exemplary wireless access point configured to distribute emergency alerts in accordance with one embodiment.

To perform the second embodiment suggested above, namely sending emergency alerts to wireless access points 57 in the geographic region 52, and allowing the wireless access points 57 to subsequently distribute the emergency alerts, wireless access points 57 must be appropriately configured to receive and distribute emergency alerts. FIG. 4 illustrates such an access point. Using such an access point, sending an emergency alert to devices 13 comprises addressing the emergency alert to each of said plurality Wi-Fi access points illustrated in FIG. 1, wherein said Wi-Fi access points relay emergency alerts to any mobile devices 13 communicating with said Wi-Fi access points.

FIG. 4 illustrates a Wi-Fi access point 400 comprising an internet interface 401 for sending and receiving communications to the internet via Internet Protocol (IP), a Short Message Service (SMS) emergency alert authentication component 405 that authenticates an emergency alert received via said internet interface 401, a wireless communications mechanism 402 that sends and receives communications to and from mobile devices 410-412, and an emergency alert distribution 406 component that distributes 406 said SMS emergency alert to all mobile devices in communication with said Wi-Fi access point 400 via said wireless communications mechanism 402.

In one embodiment, the Wi-Fi access point 400 scans all communications received via said internet interface 401 for an emergency alert identifier. The emergency alert authentication component 405 authenticates said SMS emergency alert by matching a received emergency alert identifier with an identifier 407 stored in said Wi-Fi access point 400.

Once an alert is authenticated, it must be distributed to mobile devices 410-412. A number of options are available in terms of how the alert is delivered. In one embodiment, the SMS emergency alert distribution component 406 may cause the access point 400 to send a preformatted alert to devices 410-411. Such a preformatted alert may be populated with information received in the incoming emergency alert.

In another embodiment, alert distribution component 406 injects said emergency alert into information sent to said mobile devices 410-412. For example, if mobile device 410 is viewing email, the emergency alert can be injected as an email into the data stream sent to device 410. Meanwhile, if device 411 is browsing the internet and viewing a web page, the content of a currently viewed webpage can be replaced by distribution component 406 with the emergency alert. Similarly, voice data sent to device 412 pursuant to a telephone call can be replaced with emergency alert voiceover. These are three examples of injecting emergency alert information, others will be appreciated by those of skill with the benefit of this disclosure.

Figure 5:
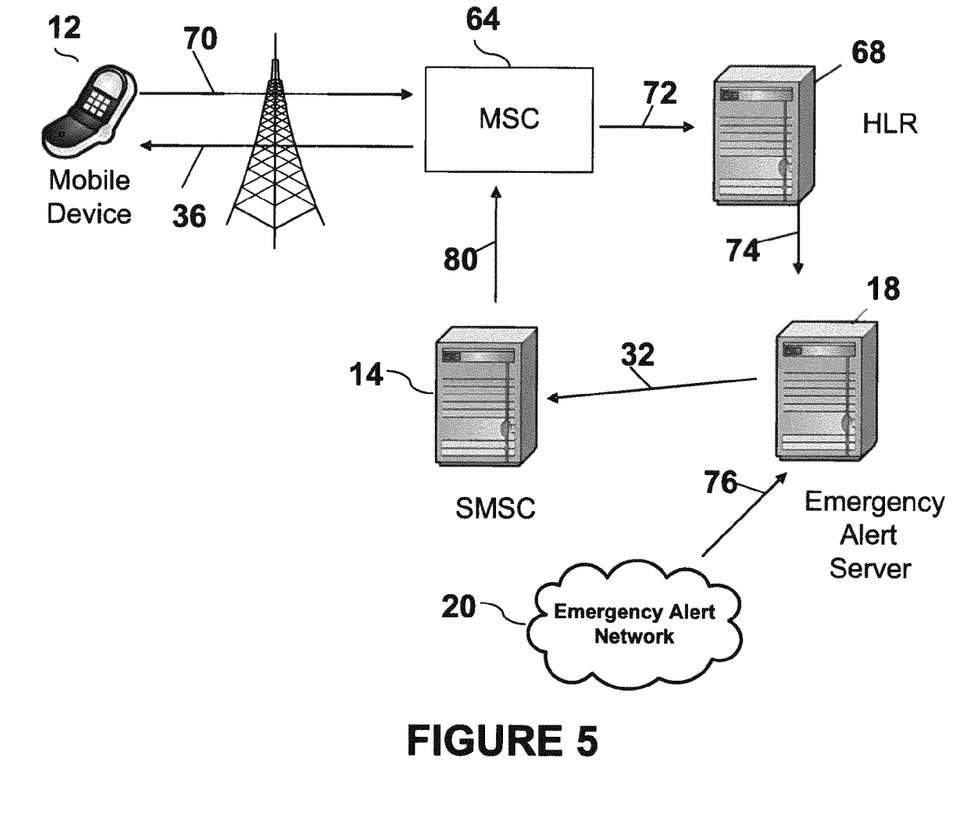
FIG. 5 is a flow diagram of another example process and system for delivering an alert message.

FIG. 5 provides a detailed flow diagram of one example process and system for delivering an SMS based alert message to cell sites in an alert area for broadcast. At step 70, the mobile device 12 connects to a cell tower, and then registers with the Mobile Switching Center (MSC) 64. The MSC 64, at step 72, provides registration information to the Home Location Register (HLR) 68. Upon receiving the registration request, the HLR 68 performs well known registration functions. HLR 68, at step 74, provides an indication of the mobile device's geographical location to the emergency alert server 18.

In an example embodiment, registration information provided (step 74) by the HLR 68 to the emergency alert server 18 comprises a subscriber ID, such as the subscriber's directory number for example, and an indication of the geographic area in which the subscriber registered, such as the MSC (e.g., cell site). The Emergency Alert Server 18 maintains a list of registered subscribers who want to receive alert messages via SMS. The Emergency Alert Server 18 also maintains a list of the MSCs currently associated with each registered subscriber who wants to receive alerts via SMS.

Each time a mobile device 12 registers with an MSC 64, steps 70, 72, and 74, are performed, and the lists maintained by the emergency alert server 18 are updated. Thus, if a subscriber registers with a first MSC 64 and later registers with a different MSC 64, the emergency alert server 18 updates the information stored therein pertaining to the subscriber, including an identification of the different MSC 64. In this way, the current location of a registered subscriber is maintained. If the HLR 68 determines that a mobile device is no longer registered, the HLR 68 provides an indication thereof to the emergency alert server 18 and the emergency alert server 18 updates accordingly information stored therein pertaining to the subscriber associated with the mobile device.

At step 76, an Emergency Alert Network 20 provides to the emergency alert server 18 an alert message and an indication of an alert area. At this point, the mobile device 12 is registered with the MSC 64. The emergency alert server 18, upon receipt (step 76) of the alert message from the Emergency Alert Network 20, determines cell sites within the alert area, as described above with reference to FIG. 1. The emergency alert server can then send individual emergency alerts to all devices registered with MSC's corresponding to identified cell sites, or can broadcast emergency alerts from the applicable cell sites to reach any and all devices regardless of whether the device is registered.

Figure 6:
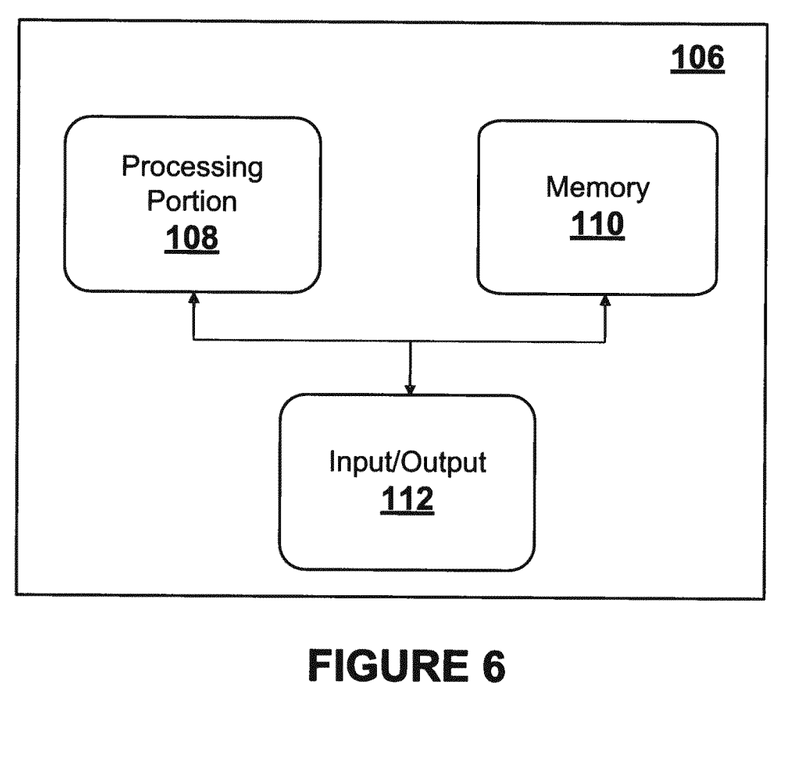
FIG. 6 is a block diagram of an exemplary electronic device configurable to implement various of the devices contemplated for use with the disclosed embodiments.
Figure 7:
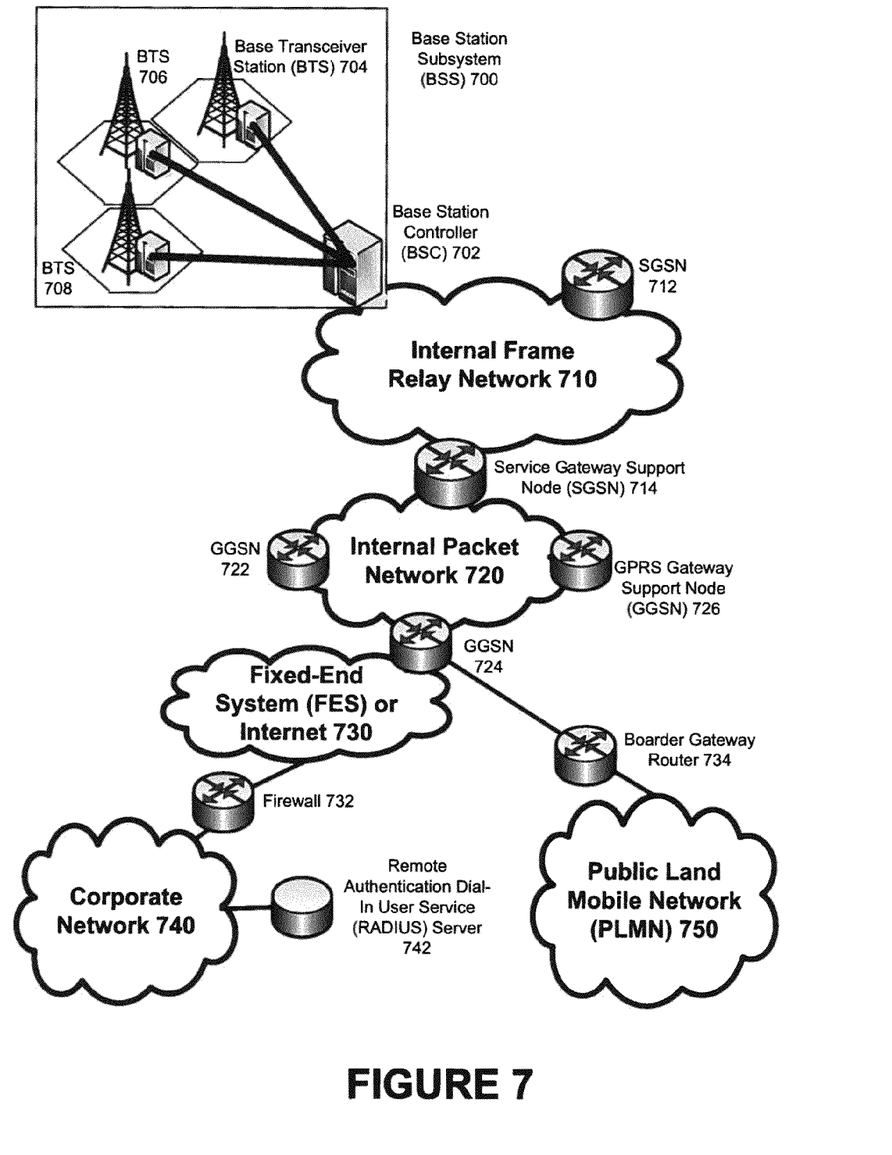
FIG. 7 depicts an overall block diagram of an exemplary packet-based mobile cellular network environment, such as a GPRS network.

FIG. 6 is a block diagram of an exemplary system 106 for implementing the various mobile devices, computers, servers, and other electronics discussed herein. The system 106 comprises a processor portion 108, a memory portion 110, and an input/output portion 112. It is emphasized that the block diagram depicted in FIG. 7 is exemplary and not intended to imply a specific implementation. Thus, the system 106 can be implemented in a single processor or multiple processors. Multiple processors can be distributed or centrally located. Multiple processors can communicate wirelessly, via hard wire, or a combination thereof. The processor 108 can comprise any appropriate device for providing communication mode information. Memory 110 may be volatile (such as RAM), non-volatile (such as ROM, flash memory, etc.) or some combination of the two. Additionally, device 106 may also have mass storage (removable and/or non-removable) such as magnetic or optical disks or tape. Input/output may comprise data communication ports as well as devices such as a keyboard, mouse, and display that presents a GUI as a graphical aid accessing the functions of the computing device 106. Other aspects of device 106 may include communication connections to other devices, computers, networks, servers, etc. using either wired or wireless media.

Examples of appropriate devices include mobile communications devices, mobile telephones, personal digital assistants (PDAs), lap top computers, handheld processors, or a combination thereof.

In various example embodiments, the system 106 can comprise, as described above, an MSC, an HLR, an Emergency Alert Server, an SMSC, a cell broadcast capability database, a broadcast server, a mapping server, or a combination thereof. Accordingly, the system 106 can, in various embodiments, perform the functions associated with each of an MSC, an HLR, an Emergency Alert Server, an SMSC, a cell broadcast capability database, a broadcast server, an SMSC, a mapping server, or a combination thereof.

As described above, cell sites providing coverage to the geographic alert area can be determined statically and/or dynamically. Alert notifications are directed to cell sites within an alert area in accordance with a mapping mechanism that identifies cell coverage within the area. Alert area definitions are mapped to associated cell sites such that emergency alerts can be delivered to subscribers within the alert area. In an example embodiment, alert areas are statically defined in accordance with geographic code references such as the Federal Information Processing Standard (FIPS), ZIP codes, and/or the National Weather Service Specific Area Message Encoder (SAME) codes. Radio Frequency (RF) propagation characteristics are determined for the areas, and used to determine if an area is capable of receiving an emergency alert notification. In another example embodiment, alert areas are defined dynamically in accordance with the Geographic Information System (GIS) Alert Mapping Service.

In one example embodiment, the emergency alert information received in step 26 in FIG. 1 comprises an indication of a statically defined alert area. The alert area is statically defined in accordance with an appropriate geographic code reference, such as the Federal Information Processing Standard (FIPS) codes, ZIP codes, and/or the National Weather Service Specific Area Message Encoder (SAME) codes, for example. The emergency alert server 18 requests, from for example a Cell ID Lookup Table in mapping server 22, the list of all cell sites within the specified geographic code reference. In an example embodiment, the Cell ID Lookup Table comprises information, for each cell site, pertaining to cell ID, cell location, associated ZIP code, associated FIPS code, associated SAME code, any other statically defined geographic code reference, or a combination thereof, for example.

In another example embodiment, the Emergency Alert Network 20 issues an emergency alert for a dynamically defined alert area to the emergency alert server 18. In an example embodiment, the description of the dynamically defined alert area is formatted in accordance with a World Geodetic System 1984 (WGS-84) format, or the like. The WGS-84 defines a fixed global reference frame for the Earth. In an example configuration, geographic areas are defined by geometric shapes, such as circles, ovals, and/or polygons, or the like. The emergency alert server 18 provides the dynamically defined alert area to the mapping server 22, which may be, e.g., a GIS based Alert Mapping Server. Mapping server 22 requests from a Cell Site Location Database all cell sites which are contained within the boundaries of the alert area. In an example embodiment, the cell sites within the boundaries of the alert area are determined in accordance with the location, such as latitude and longitude, of respective cell sites.

The Cell Site Location Database can comprise any appropriate database. In an example embodiment, the Cell Site Location Database comprises information pertaining to cell sites such as a cell ID of each cell site and a cell location (e.g., latitude and longitude) of each cell site, for example. Upon receiving the request from the GIS based Alert Mapping Server, the Cell Site Location Database identifies all cell sites associated with the specified dynamically defined alert area. The Cell Site Location Database provides, to the GIS based Alert Mapping Server 22, the list of identified cell sites. In an example embodiment, the list comprises a Cell ID for each identified cell site associated with the dynamically defined alert area. In another example embodiment, the list also comprises the cell location of each identified cell site.

GIS based Alert Mapping Server 22 may also request from the Cell Site RF Propagation Database, the RF propagation characteristics for each cell site within the list of Cell IDs for the alert area. The Cell Site RF Propagation Database retrieves, and/or determines, the RF propagation characteristics for each cell site in the list of Cell IDs for the alert area. The RF Propagation Database can comprise a software program that is executed in response to a request for RF propagation characteristics. The software program embodiment of the RF Propagation Database can reside in any appropriate processor, such as the GIS based Alert Mapping Server 22, for example. In an example embodiment, the GIS based Alert Mapping Server 56 comprises a mapping of Cell ID to input for the RF propagation software, e.g., latitude, longitude, and height of the cell site transmitter antenna, power output of the transmitters, and/or antenna characteristics such as gain, for example. This information can be used to dynamically determine the exact broadcast coverage for sending emergency alerts to a targeted area.

The cellular radio network and/or the wireless broadcast network depicted herein can comprise any appropriate telephony radio network. The Emergency Alert Network depicted herein can comprise any appropriate emergency alert network, such as a telephony radio network, for example. Further, techniques for the delivery of emergency alerts can be implemented with appropriate telephony radio networks. The following description sets forth some exemplary telephony radio networks, such as the global system for mobile communications (GSM), and non-limiting operating environments. The below-described operating environments should be considered non-exhaustive, however, and thus the below-described network architectures merely show how techniques for the delivery of emergency alerts can be incorporated with existing network structures and architectures. It can be appreciated, however, that the techniques for the delivery of emergency alerts can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the determination of EAS delivery can be applied independently of the method of data transport, and do not depend on any particular network architecture, or underlying protocols.

FIG. 7 depicts an overall block diagram of an exemplary packet-based mobile cellular network environment, such as a GPRS network, in which the various determination mechanisms for delivery of alert messages can be practiced. In such an environment, there are a plurality of Base Station Subsystems ("BSS") 700 (only one is shown), each of which comprises a Base Station Controller ("BSC") 702 serving a plurality of Base Transceiver Stations ("BTS") such as BTSs 704, 706, and 708. BTSs 704, 706, 708, etc. are the access points where users of packet-based mobile devices (e.g., mobile device 12) become connected to the wireless network. In exemplary fashion, the packet traffic originating from user devices (e.g., user device 20) is transported via an over-the-air interface to a BTS 708, and from the BTS 708 to the BSC 702. Base station subsystems, such as BSS 700, are a part of internal frame relay network 710 that can include Service GPRS Support Nodes ("SGSN") such as SGSN 712 and 714. Each SGSN is connected to an internal packet network 720 through which a SGSN 712, 714, etc. can route data packets to and from a plurality of gateway GPRS support nodes (GGSN) 722, 724, 726, etc. As illustrated, SGSN 714 and GGSNs 722, 724, and 726 are part of internal packet network 720. Gateway GPRS serving nodes 722, 724 and 726 mainly provide an interface to external Internet Protocol ("IP") networks such as Public Land Mobile Network ("PLMN") 750, corporate intranets 740, or Fixed-End System ("FES") or the public Internet 730. As illustrated, subscriber corporate network 740 may be connected to GGSN 724 via firewall 732; and PLMN 750 is connected to GGSN 724 via boarder gateway router 734. The Remote Authentication Dial-In User Service ("RADIUS") server 742 may be used for caller authentication when a user of a mobile cellular device calls corporate network 740.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 8:
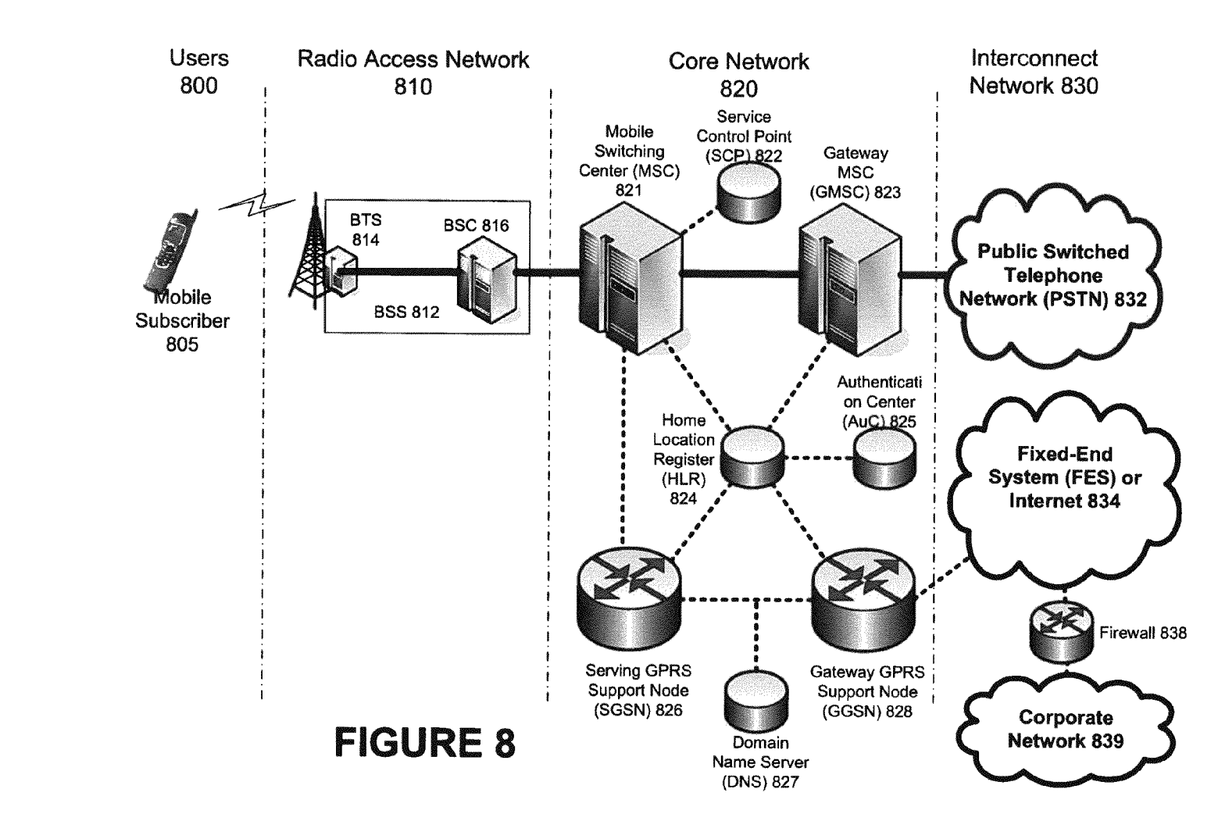
FIG. 8 depicts an architecture of a typical GPRS network as segmented into four groups.

FIG. 8 illustrates an architecture of a typical GPRS network as segmented into four groups: users 850, radio access network 860, core network 870, and interconnect network 880. Users 850 comprise a plurality of end users (though only mobile subscriber 855 is shown in FIG. 8). In an example embodiment, the device depicted as mobile subscriber 855 comprises mobile device 12. Radio access network 860 comprises a plurality of base station subsystems such as BSSs 862, which include BTSs 864 and BSCs 866. Core network 870 comprises a host of various network elements. As illustrated here, core network 870 may comprise Mobile Switching Center ("MSC") 871, Service Control Point ("SCP") 872, gateway MSC 873, SGSN 876, Home Location Register ("HLR") 874, Authentication Center ("AuC") 875, Domain Name Server ("DNS") 877, and GGSN 878. Interconnect network 880 also comprises a host of various networks and other network elements. As illustrated in FIG. 8, interconnect network 880 comprises Public Switched Telephone Network ("PSTN") 882, Fixed-End System ("FES") or Internet 884, firewall 888, and Corporate Network 889.

A mobile switching center can be connected to a large number of base station controllers. At MSC 871, for instance, depending on the type of traffic, the traffic may be separated in that voice may be sent to Public Switched Telephone Network ("PSTN") 882 through Gateway MSC ("GMSC") 873, and/or data may be sent to SGSN 876, which then sends the data traffic to GGSN 878 for further forwarding.

When MSC 871 receives call traffic, for example, from BSC 866, it sends a query to a database hosted by SCP 872. The SCP 872 processes the request and issues a response to MSC 871 so that it may continue call processing as appropriate.

The HLR 874 is a centralized database for users to register to the GPRS network. HLR 874 stores static information about the subscribers such as the International Mobile Subscriber Identity ("IMSI"), subscribed services, and a key for authenticating the subscriber. HLR 874 also stores dynamic subscriber information such as the current location of the mobile subscriber. Associated with HLR 874 is AuC 875. AuC 875 is a database that contains the algorithms for authenticating subscribers and includes the associated keys for encryption to safeguard the user input for authentication.

In the following, depending on context, the term "mobile subscriber" sometimes refers to the end user, such as the user having a disability for example, and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 8, when mobile subscriber 855 initiates the attach process by turning on the network capabilities of the mobile device, an attach request is sent by mobile subscriber 855 to SGSN 876. The SGSN 876 queries another SGSN, to which mobile subscriber 855 was attached before, for the identity of mobile subscriber 855. Upon receiving the identity of mobile subscriber 855 from the other SGSN, SGSN 876 requests more information from mobile subscriber 855. This information is used to authenticate mobile subscriber 855 to SGSN 876 by HLR 874. Once verified, SGSN 876 sends a location update to HLR 874 indicating the change of location to a new SGSN, in this case SGSN 876. HLR 874 notifies the old SGSN, to which mobile subscriber 855 was attached before, to cancel the location process for mobile subscriber 855. HLR 874 then notifies SGSN 876 that the location update has been performed. At this time, SGSN 876 sends an Attach Accept message to mobile subscriber 855, which in turn sends an Attach Complete message to SGSN 876.

After attaching itself with the network, mobile subscriber 855 then goes through the authentication process. In the authentication process, SGSN 876 sends the authentication information to HLR 874, which sends information back to SGSN 876 based on the user profile that was part of the user's initial setup. The SGSN 876 then sends a request for authentication and ciphering to mobile subscriber 855. The mobile subscriber 855 uses an algorithm to send the user identification (ID) and password to SGSN 876. The SGSN 876 uses the same algorithm and compares the result. If a match occurs, SGSN 876 authenticates mobile subscriber 855.

Next, the mobile subscriber 855 establishes a user session with the destination network, corporate network 889, by going through a Packet Data Protocol ("PDP") activation process. Briefly, in the process, mobile subscriber 855 requests access to the Access Point Name ("APN"), for example, UPS.com, and SGSN 876 receives the activation request from mobile subscriber 855. SGSN 876 then initiates a Domain Name Service ("DNS") query to learn which GGSN node has access to the UPS.com APN. The DNS query is sent to the DNS server within the core network 870, such as DNS 877, which is provisioned to map to one or more GGSN nodes in the core network 870. Based on the APN, the mapped GGSN 878 can access the requested corporate network 889. The SGSN 876 then sends to GGSN 878 a Create Packet Data Protocol ("PDP") Context Request message that contains necessary information. The GGSN 878 sends a Create PDP Context Response message to SGSN 876, which then sends an Activate PDP Context Accept message to mobile subscriber 855.

Once activated, data packets of the call made by mobile subscriber 855 can then go through radio access network 860, core network 870, and interconnect network 880, in a particular fixed-end system or Internet 884 and firewall 888, to reach corporate network 889.

Thus, network elements that can invoke the functionality of the emergency alert mapping system can include but are not limited to Gateway GPRS Support Node tables, Fixed End System router tables, firewall systems, VPN tunnels, and any number of other network elements as required by the particular digital network.

While example embodiments of techniques for the delivery of emergency alerts have been described in connection with various computing devices/processor, the underlying concepts can be applied to any computing device, processor, or system capable delivering emergency alerts. The various techniques described herein can be implemented in connection with hardware or software or, where appropriate, with a combination of both. Thus, the methods and apparatuses for the various techniques for the delivery of emergency alerts, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for techniques for the delivery of emergency alerts. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for techniques for the delivery of emergency alerts also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing techniques for the delivery of emergency alerts. When implemented on a general-purpose processor, the program code combines with the processor to provide a unique apparatus that operates to invoke the functionality of the various techniques for the delivery of emergency alerts. Additionally, any storage techniques used in connection with the techniques for the delivery of emergency alerts can invariably be a combination of hardware and software.

While techniques for the delivery of emergency alerts have been described in connection with the various embodiments of the various figures, it is to be understood that other similar embodiments can be used or modifications and additions can be made to the described embodiment for performing the same function of the various techniques for the delivery of emergency alerts without deviating therefrom. For example, one skilled in the art will recognize that techniques for the delivery of emergency alerts as described in the present application may apply to any environment, and may be applied to any number of devices connected via a communications network and interacting across the network. Therefore, techniques for the delivery of emergency alerts should not be limited to any single embodiment, but rather should be construed in breadth and scope in accordance with the appended claims.

We claim:

1. A method comprising:
   receiving a Short Message Service (SMS) emergency alert addressed for a Wi-Fi access point at said Wi-Fi access point via an internet interface configured to send and receive communications using Internet Protocol (IP);
   authenticating said SMS emergency alert received via said internet interface at said Wi-Fi access point;
   transmitting said SMS emergency alert from said Wi-Fi access point via a wireless communications mechanism configured to exchange communications with a first mobile device by:
     determining a first application currently being used on said first mobile device,
     formatting said SMS emergency alert in a format such that said first application is capable of presenting said SMS emergency alert, and
     sending said SMS emergency alert as part of a first data stream comprising first data for said first application; and
   subsequently transmitting said SMS emergency alert from said Wi-Fi access point via the wireless communications mechanism configured to exchange communications with a second mobile device by:
     determining a second application currently being used on said second mobile device, wherein said second application is different than said first application,
     formatting said SMS emergency alert in a second format such that the second application is capable of presenting said SMS emergency alert, and
     sending said SMS emergency alert as part of a second data stream comprising second data for said second application.

2. The method of claim 1, wherein said first application is a voice call application, and wherein formatting and sending said SMS emergency alert comprises replacing voice data with audible content derived from the SMS emergency alert.

3. The method of claim 1, further comprising scanning all communications received via said internet interface for an emergency alert identifier.

4. The method of claim 3, further comprising authenticating said SMS emergency alert by matching a received emergency alert identifier with an identifier stored at said Wi-Fi access point.

5. The method of claim 1, wherein said second application is a web browser, and wherein formatting and sending said SMS emergency alert comprises replacing content of a currently viewed web page with the SMS emergency alert.

6. The method of claim 1, wherein said first application is a web browser, and wherein formatting and sending said SMS emergency alert comprises replacing content of a currently viewed web page with the SMS emergency alert.

7. The method of claim 1, further comprising receiving said SMS emergency alert from a government Emergency Alert System (EAS).

8. A system comprising:
   an internet communications component for sending and receiving communications via Internet Protocol (IP), wherein said internet communications component receives a Short Message Service (SMS) emergency alert addressed for said internet communications component;
   an SMS emergency alert authentication component that authenticates said SMS emergency alert received via said internet communications component;
   a wireless communications component configured to exchange communications with first mobile devices and second mobile devices;
   an emergency alert distribution component that distributes said SMS emergency alert by:
     determining a first application currently being used on each of said first mobile devices,
     formatting said SMS emergency alert such that said first application is capable of presenting said SMS emergency alert, and
     transmitting said SMS emergency alert as part of a first data stream comprising first data for said first application; and
   subsequently transmitting said SMS emergency alert from said Wi-Fi access point via the wireless communications mechanism configured to exchange communications with said second mobile devices by:
     determining a second application currently being used on each of said second mobile devices, wherein said second application is different than said first application,
     formatting said SMS emergency alert in a second format such that the second application is capable of presenting said SMS emergency alert, and
     transmitting said SMS emergency alert as part of a second data stream comprising second data for said second application.

9. The system of claim 8, wherein said second application is a voice call application, and wherein formatting and transmitting said SMS emergency alert comprises replacing voice data with audible content derived from the SMS emergency alert.

10. The system of claim 8, further comprising sending said SMS emergency alert to each of said first mobile devices using IP communications.

11. The system of claim 8, wherein said SMS emergency alert is accompanied by an emergency alert identifier.

12. The system of claim 11, wherein said SMS emergency alert authentication component matches the received emergency alert identifier with a stored identifier.

13. The system of claim 8, wherein said SMS emergency alert authentication component scans all communications received via said internet communications component for an emergency alert identifier.

14. The system of claim 8, wherein said first application is a voice call application, and wherein formatting and transmitting said SMS emergency alert comprises replacing voice data with audible content derived from the SMS emergency alert.

15. The system of claim 8, wherein said first application is a web browser, and wherein formatting and transmitting said SMS emergency alert comprises replacing content of a currently viewed web page with the SMS emergency alert.

16. A Wi-Fi access point, comprising:
- an internet interface for sending and receiving communications via Internet Protocol (IP), wherein said internet interface receives a Short Message Service (SMS) emergency alert addressed for said Wi-Fi access point;
- an SMS emergency alert authentication component that authenticates said SMS emergency alert received via said internet interface;
- a wireless communications mechanism that exchanges communications with mobile devices; and
- an emergency alert distribution component that distributes said SMS emergency alert via said wireless communications mechanism by:
    - determining that a first application currently being used on a first mobile device among the mobile devices is a web browser,
    - formatting said SMS emergency alert in a format such that said web browser is capable of presenting said SMS emergency alert in a web page,
    - sending said SMS emergency alert as part of a data stream comprising data for said web browser by replacing content of a currently viewed web page with the SMS emergency alert,
    - determining that a second application currently being used on a second mobile device among the mobile devices is an email application,
    - formatting said SMS emergency alert in a format such that said email application is capable of presenting said SMS emergency alert as an email, and
    - sending said SMS emergency alert as part of a data stream comprising data for said email application.

17. The Wi-Fi access point of claim 16, wherein said Wi-Fi access point scans all communications received via said internet interface for an emergency alert identifier.

18. The Wi-Fi access point of claim 16, wherein said emergency alert authentication component authenticates said SMS emergency alert by matching a received emergency alert identifier with an identifier stored in said Wi-Fi access point.

* * * * *